United States Patent [19]

Riede

[11] 4,051,041
[45] Sept. 27, 1977

[54] DEVICE FOR DIFFUSION OF SUBSTANCES BETWEEN TWO FLUIDS THROUGH SEMIPERMEABLE MEMBRANES

[75] Inventor: Gerhard Riede, Eslov, Sweden

[73] Assignee: Gambro AG, Switzerland

[21] Appl. No.: 592,666

[22] Filed: July 2, 1975

Related U.S. Application Data

[63] Continuation of Ser. No. 446,265, Feb. 27, 1974, abandoned.

[30] Foreign Application Priority Data

Mar. 21, 1973 Sweden .............................. 7339489

[51] Int. Cl.² ............................................ B01D 31/00
[52] U.S. Cl. .................................. 210/321 B; 210/541
[58] Field of Search ...................... 210/321 B, 22, 541

[56] References Cited

U.S. PATENT DOCUMENTS

| 3,534,860 | 10/1970 | Dibelius et al. | 210/321 B |
| 3,734,298 | 5/1973 | Riede et al. | 210/321 B |

*Primary Examiner*—Frank A. Spear, Jr.

[57] ABSTRACT

A dialysis device having alternating spacers and pairs of semipermeable membranes disposed therebetween, and an inlet channel for the dialysis liquid traversing the assembly of alternating spacers and pairs of membranes, said spacers including passages for introducing and distributing the dialysis liquid into the space outside each pair of membranes while sealing the membranes together.

7 Claims, 12 Drawing Figures

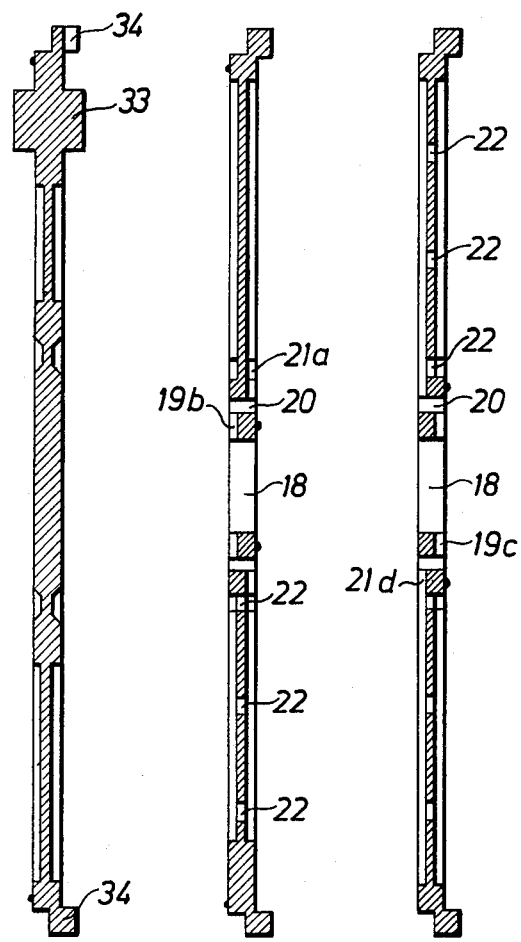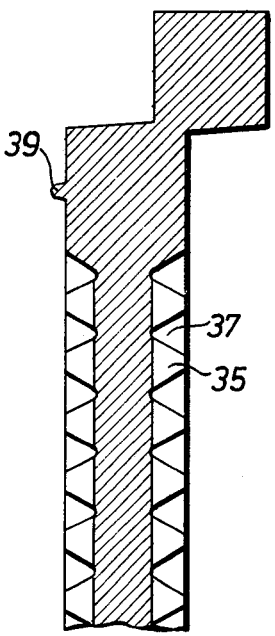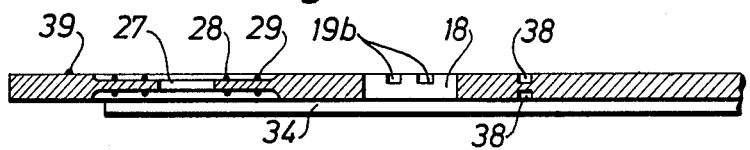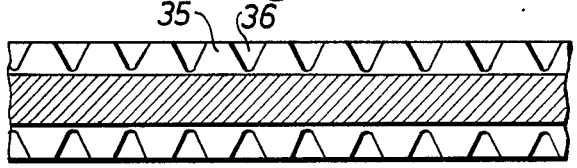

DEVICE FOR DIFFUSION OF SUBSTANCES BETWEEN TWO FLUIDS THROUGH SEMIPERMEABLE MEMBRANES

This is a continuation of application Ser. No. 446,265 filed Feb. 27 1974, now abandoned.

The present invention relates to a device for diffusion of substances between two fluids through semipermeable membranes which are arranged in pairs between the spacers in a stack of at least two such spacers, each spacer comprising at each end thereof passages for each fluid connected with an inlet and an outlet, respectively, a first fluid being adapted to be led between the membranes arranged in pairs and a second fluid between these membranes and adjacent spacers.

The device according to the invention is preferably designed to be used as a so called artificial kidney i.e. for purification of blood by means of dialysis. To those skilled in the art, however, it is obvious that the device according to the invention may be utilized also for other purposes, for instance for purifying other liquids or for oxygenizing liquids. In the latter case there is a diffusion of oxygen from one side of a membrane to a liquid, for instance blood, on the other side of the same membrane. Thus, in the present specification, the term fluid will refer to gas as well as to liquid.

As mentioned above the principal use of the device according to the invention is for the purification of blood. The invention will therefore be described below with reference to blood dialysis.

A modern device for blood dialysis, i.e. a socalled artificial kidney, should meet with a plurality of requirements. It is an object of the present invention to fulfill as many as possible of these requirements. As examples of requirements that should be satisfied, reference may be made to the following.

The dialysis effect should be satisfactory also when a very small quantity of blood is used.

The flow resistance in the blood passages should be negligible in order to dispense with, if possible, the use of a blood pump.

The quantity of blood remaining after the treatment should be as small as possible so that any addition of blood in the patient is minimized or avoided since any such addition of blood may incur the risk of hepatitis in the patient.

The total weight of the kidney should be as low as possible. The components of the kidney should be simple and cheap, to manufacture by mass fabrication so that the kidney may be discarded after use.

The flow of blood as well as of salt solution should be uniform across the whole cross section of the kidney so that all blood will be effectively purified. Thus, an even distribution especially of blood is required, between the membranes of the respective pairs of membranes as well as distribution of purifying liquid between the different pairs of membranes and the spacers.

The kidney should form a completely closed system which may be directly connected to suitable hoses for blood and purifying liquid. Also these hoses should preferably be of a disposable nature so that the whole system may be discarded after use.

To achieve an efficient purification of blood without using an excessive quantity thereof, the kidney should comprise a plurality of relatively small components and these components should be capable of assembly in a simple way to avoid any risk of leakage between the passages for blood and purifying liquid.

The membranes of the kidney for separating blood and purifying liquid must be effectively supported so that they will not be so strained that the result will be a rupture.

In particular the invention provides very effective distribution of the purifying liquid although no separate salt distribution plates are needed as in prior art devices of a similar kind.

The above requirements and a plurality of further requirements will be fulfilled by the artificial kidney described below with reference to the attached drawings which disclose an illustrative preferred embodiment of the invention.

In the drawings

Figure 2:
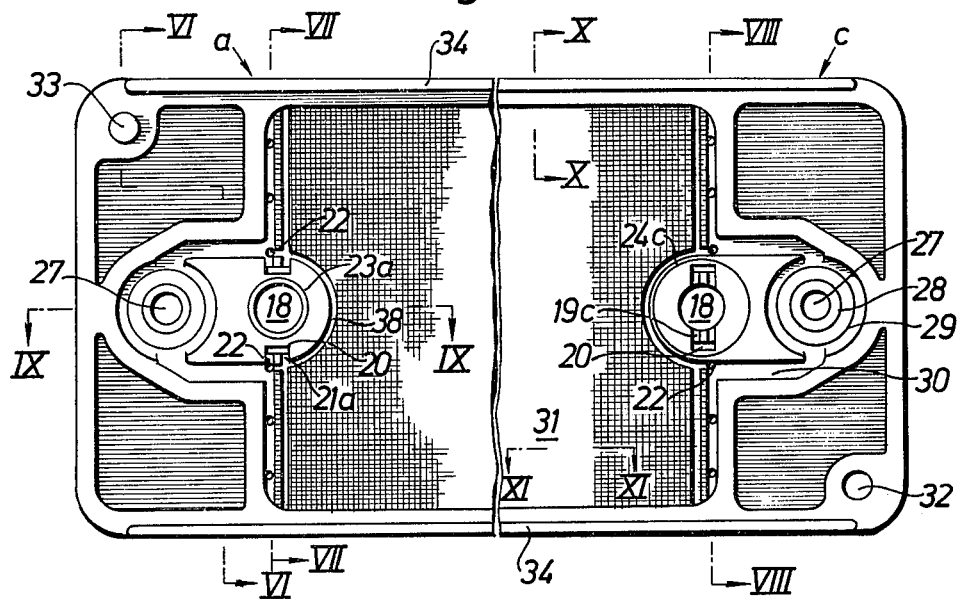
FIG. 2 shows a top surface of a kidney spacer.
Figure 4:
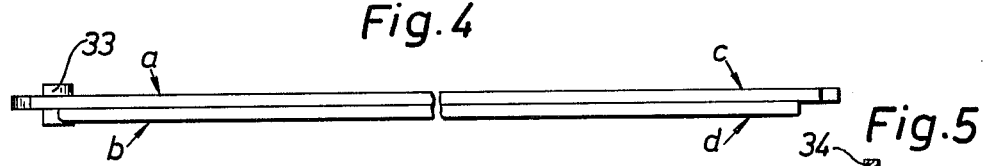
Figure 5:
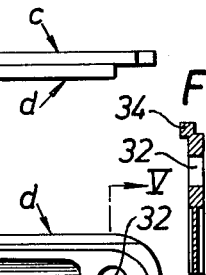
Figure 3:
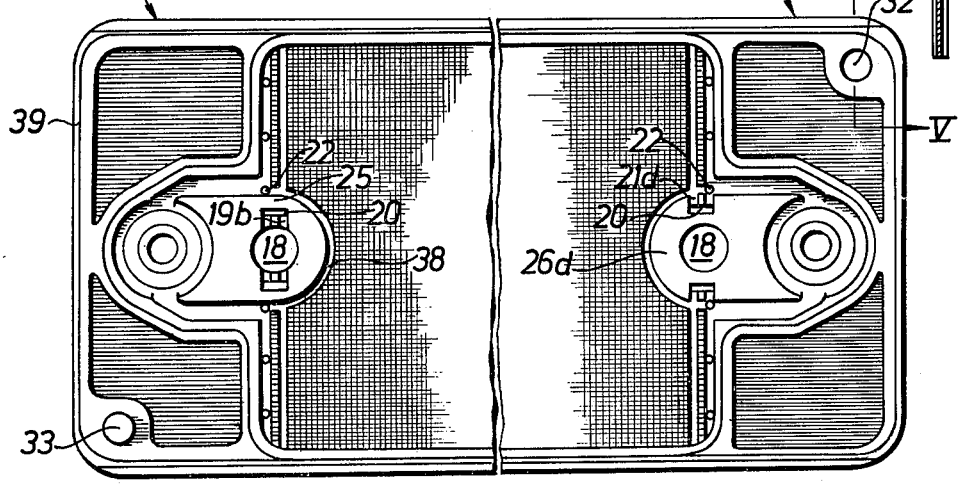

FIG. 3 in the same way shows the underside of the same spacer;

FIG. 4 in the same way shows a condensed side view of the same spacer;

FIG. 5 shows a detailed section along a line V—V in FIG. 3;

FIG. 6 shows a section along a line VI—VI in FIG. 2;

FIG. 7 shows a section along a line VII—VII in FIG. 2;

FIG. 8 shows a section along a line VIII—VIII in FIG. 2;

FIG. 9 shows a section along a line IX—IX in FIG. 2;

FIG. 10 shows a section along a line X—X in FIG. 2; and

FIG. 11, finally, shows a section along a line XI—XI in FIG. 2.

Figure 1A:
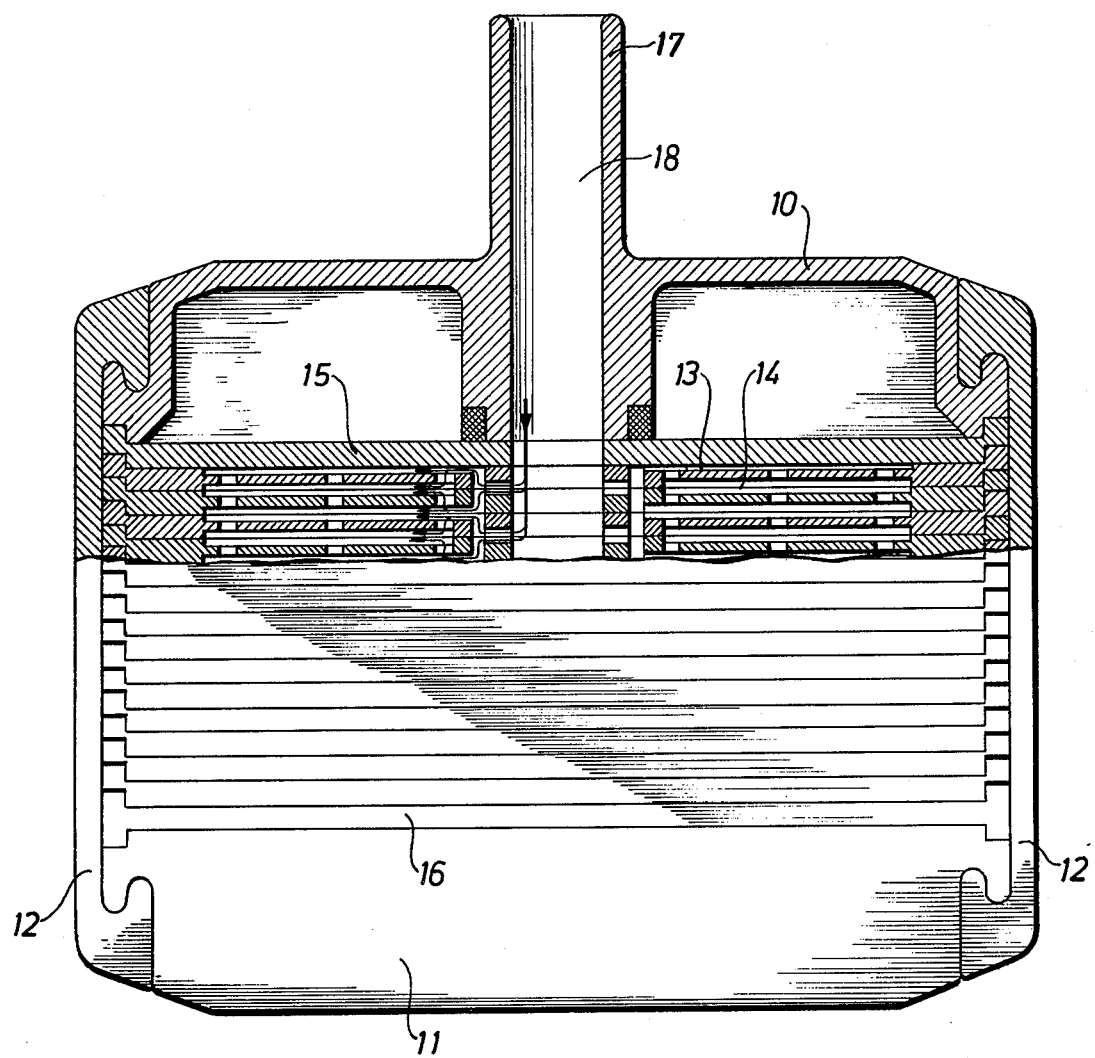
FIG. 1A shows a partial section through one end of an elongated artificial kidney according to the invention.
Figure 1B:
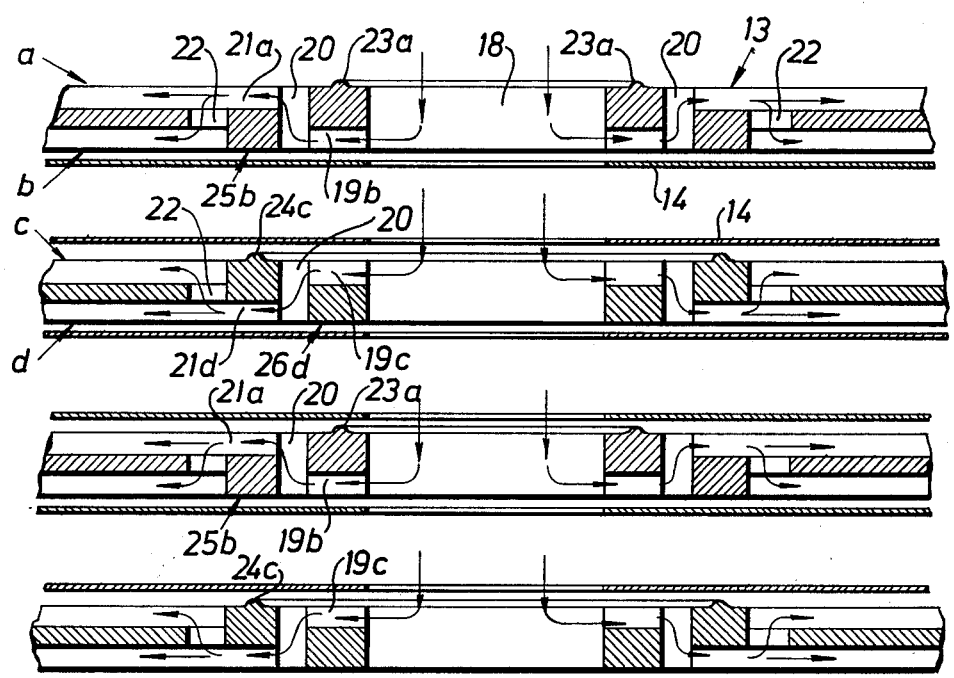
FIG. 1B shows an enlarged detail of FIG. 1A with spacers and membranes of the kidney spaced apart.

As will be best understood from a study of FIGS. 1A and 1B the illustrative embodiment of the kidney according to the present invention comprises an upper clamp plate 10 and a lower clamp plate 11 which are interconnected by clamp rails 12. Between the clamp plates 10 and 11 a bundle of identically formed spacers 13 and membranes 14 arranged in pairs are clamped. The end of this bundle is defined by an upper end plate 15 and a lower end plate 16. A salt solution is supplied through a nipple 17 with an interior passage 18. Said passage 18 extends through the whole bundle of spacers and intermediate membranes.

In the same way blood is supplied through another nipple. This is not shown in detail, however, since the method of supplying blood forms no part of the present invention. It may for instance be effected in a way disclosed in U.S. Pat. No. 3,837,496 or one of U.S. Pat. Nos. 3,411,630 and 3,516,548.

The path of flow of the salt solution will be best understood from a study of FIG. 1B. From the passage 18 the solution will flow through radially disposed interior distribution passages 19B and 19C, said passages being located at the oppposite ends of the spacer on the lower side and the upper side thereof, respectively, in relation to the passage 18. To provide the arrangement shown in FIG. 1B every second spacer has been moved 180° without being turned over, i.e. with the same side turned upwards during the whole time.

From the passages 19b and 19c the salt solution will flow through interior subsidiary passages 20 intersecting the spacer to the opposite side of the spacer. From the subsidiary passages 20 the liquid will then flow through radially disposed outer distribution passages 21a and 21d, said passages being located at the opposite ends of the spacer on the upper side and the under side thereof, respectively. Outside the passages 21a and 21d there are outer subsidiary passages 22 intersecting the spacer. Thanks to said passages the liquid from passages 21a and 21d can flow further along the two outer sides of the spacer.

To prevent the salt solution from flowing into the space between the membranes 14 there are interior annular sealing beads 23a and outer sealing beads 24c which are also of annular shape. These sealing beads are arranged to engage outer smooth annular sealing surfaces 25b and interior annular sealing surfaces 26d which are also smooth. As will be best understood from FIG. 1B for instance the outer annular sealing bead 24c is designed to engage the outer smooth annular sealing surface 25b. In the same way the interior sealing bead 23a will engage the interior sealing surface 26d.

Thus the letters a, b, c and d, respectively, represent four different end surfaces of the identically formed spacers. Now if FIG. 1B is taken to represent the four uppermost spacers of a kidney at one end thereof, the following series of end surfaces will be obtained as seen from the top: a, b, c, d, a, b, c, d. At the opposite end of the kidney there is instead an outlet built essentially in the same way but in which the uppermost surfaces will be represented by the series c, d, a, b, c, d, a, b. Thus at the opposite end there is a nipple corresponding to the nipple 17 which operates as an outlet for the purifying liquid.

In FIGS. 2 to 4 the ends of the spacer are shown as seen in top, bottom and side view, respectively. The intermediate major portion of the active surface of the spacer is cut away. In reality the length of the spacer is about 10 times its width. In the figures 2–4 the same designations occur as in FIG. 1B. In addition, bores 27 are shown which are connected with the inlet and outlet for the blood. These bores 27 are surrounded by annular sealing beads 28 and 29. The blood is led past these beads by means of special blood distribution buttons disposed between the membranes, said buttons not being shown since they are not part of the present invention. The blood which is led in the course of this process between the membranes is consequently led through the blood distribution passages 30 out over the active surface 31 of the spacer while between the membranes. The numeral 32 refers to recesses which are designed to receive shoulders 33 when the kidney is assembled. The numeral 34 refers to side rims giving the spacers the recessed shape, which will best be seen from FIG. 1A.

The active surface of the spacer will best be seen from FIGS. 10 and 11. Said surface comprises a number of shoulders 35 with intermediate transverse and longitudinal passages 36 and 37, respectively, the longitudinal passages 37 being somewhat deeper than the transverse passages 36. In between the shoulders 35 the membranes arranged in pairs will be squeezed together at a great many closely adjacent points whereby said membranes will be effectively supported at the same time as blood passages are formed opposite the passages 36 and 37.

In FIGS. 2 and 3 the numeral 38 refers to a semicircular passage for the purifying liquid. Said passage also occurs in FIG. 9 which shows a section through the flow passage 18 for the salt solution as well as the corresponding passage 27 for the blood. In FIG. 9 there is also shown a sealing bead 39 which also is shown in FIGS. 3 and 10. Said sealing bead extends in principle around the whole active surface of the membranes arranged in pairs and of the spacers including the arrangement for distribution of blood and salt solution.

The applicability of the invention is of course not confined to the illustrative embodiment described above but may be varied within the scope of the following claims. For instance the active surface of the spacers may be formed in many various ways according to prior art technique.

I claim:

1. A device for diffusion of substances between two liquids through semipermeable membranes comprising a plurality of spacer elements each having inlet and outlet openings at opposed ends thereof, said inlet and outlet openings being aligned when said spacer elements are arranged in stacked relation, said spacer elements having recessed portions on opposite sides thereof spaced from the inlet and outlet openings and extending between said openings, pairs of membranes disposed between each of said spacer elements and provided only with inlet and outlet openings at opposed ends thereof coinciding with the inlet and outlet openings in said spacer elements when arranged in stacked relation, a first liquid being passed between the membranes of each pair and a second liquid being passed over the outer surfaces of each membrane and through the recessed portions of adjacent spacer elements, each spacer element having at least one first recessed groove on one side thereof extending away from an opening, a first transverse passage extending between the outer end of said at least one first recessed groove on the one side and the opposed side of said spacer element, a second recessed groove on the opposed side of said spacer element extending from the first transverse passage to the recessed portion on the opposed side of said spacer element and a second transverse passage extending between the outer end of the second recessed groove and the one side of said spacer element for communicating with the recessed portion on the one side of said spacer element, the surface of each spacer element adjacent to and surrounding said at least one first recessd groove, the opening and said first transverse passage forming a continuous seal with the adjacent surface of the superposed spacer element with a pair of membranes therebetween when said spacer elements and pairs of membranes are clamped together in alternate stacked relation to prevent leakage of the second liquid from the at least one first recessed groove into the first liquid passing between the membranes of each pair.

2. A device for diffusion of substances between two liquids through semipermeable membranes comprising a plurality of spacer elements each having inlet and outlet openings at opposed ends thereof and recessed portions on opposite sides thereof spaced from the inlet and outlet openings and extending between said openings, pairs of membranes disposed between each of said spacer elements and provided with inlet and outlet openings at opposed ends thereof coinciding with the inlet and outlet openings in said spacer elements when arranged in stacked relation, a first fluid being passed between the membranes of each pair and a second liquid being passed over the outer surface of each membrane and through the recessed portions of adjacent spacer elements, each spacer element having an inner annular portion surrounding each opening and an outer annular portion surrounding the inner annular portion, said inner annular portion being provided with at least one radial groove on one side thereof extending outwardly from the opening and a sealing surface on the opposed side thereof and said outer annular portion being provided with at least one radial groove on one side thereof leading to one of said recesses and opposed to the groove on the inner annular portion and a sealing surface on the opposite side thereof, and at least one passage connecting the outer end of the at least one inner radial groove and the inner end of the at least one outer radial groove to establish communication between the opening and a recessed portion of the spacer elements, the inner and outer radial grooves of adjacent spacer elements being disposed alternately on opposite sides of successive spacer elements so that successive pairs of membranes are alternately disposed between the facing inner radial grooves and the facing outer radial grooves of adjacent spacer elements, whereby when the spacer elements and pairs of membranes are arranged in stacked relation, the sealing surfaces of opposed, adjacent spacer elements sealingly clamp the pairs of membranes together, each spacer element having at least one passage connecting the two opposed recessed portions and disposed outwardly of the outer annular portion thereof.

3. A device as claimed in claim 2 wherein one of the sealing surfaces which sealingly clamp the pairs of membranes is provided with sealing means.

4. A device as claimed in claim 2 wherein the at least one inner radial groove and the at least one outer radial groove comprise two inner grooves and two outer grooves, said pairs of grooves being disposed diametrically opposite each other with respect to the openings.

5. A device as claimed in claim 2 wherein the at least one passage connecting the two opposed recessed portions of each spacer element comprises a plurality of spaced connecting passages arranged radially outwardly from each opening in each spacer element.

6. A device as claimed in claim 2 wherein the recessed portions of each spacer element are provided with a plurality of spaced protuberances for supporting the pairs of membranes in spaced relation with respect to the spacer elements while providing passages therearound for passage of the first liquid between the pairs of membranes and for reducing the volume of the first liquid present in the device at any one time.

7. A device as claimed in claim 2 wherein each spacer element is identical and each is provided with grooves and sealing surfaces at one opening and, at the opposed opening, is provided with grooves and sealing surfaces such that the alternate spacer elements, when turned 180° about a vertical axis, provide the relative positions with respect to each other for passage of the second liquid and for sealing the pairs of membranes.

* * * * *